United States Patent Office 2,772,145
Patented Nov. 27, 1956

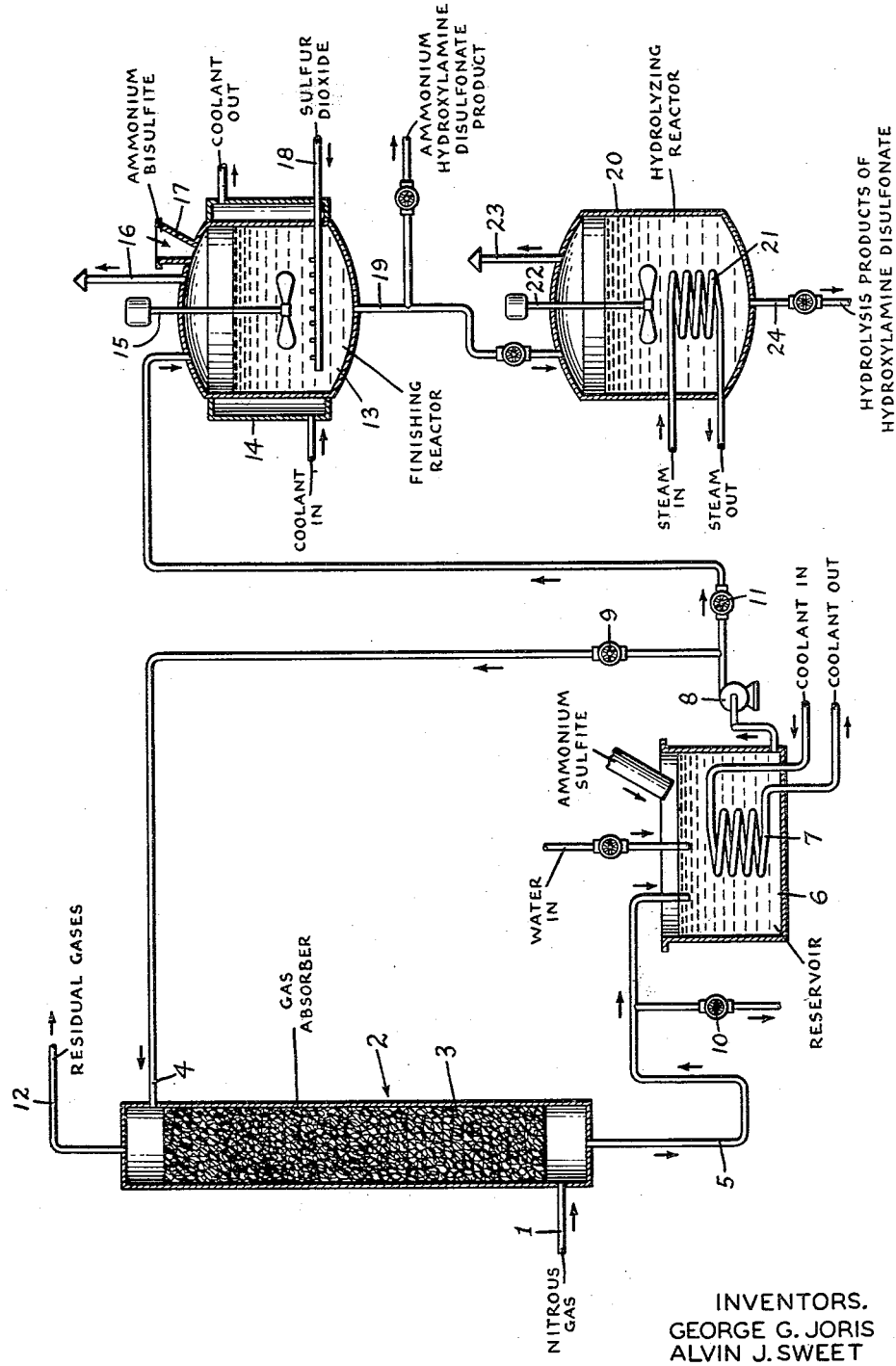

2,772,145

PROCESS FOR MAKING AMMONIUM NITRITE AND AMMONIUM HYDROXYLAMINE DISULFONATE

George G. Joris, Madison, N. J., and Alvin J. Sweet, East Aurora, N. Y., assignors to Allied Chemical & Dye Corporation, New York, N. Y., a corporation of New York Application February 27, 1953, Serial No. 339,272

4 Claims. (Cl. 23—104)

This invention relates to the production of ammonium nitrite, ammonium hydroxylamine disulfonate, the hydrolyzed derivatives of this disulfonate, and their mixtures, and more particularly to a method whereby these compounds can be produced directly from nitrous gases, that is, gases containing the oxide of trivalent nitrogen or, more likely, its equivalent in nitric oxide, nitrogen dioxide, and oxygen.

For many years it has been the practice to make an aqueous solution of an alkali nitrite and to treat it with sulfur dioxide and a bisulfite salt until the proper conditions of high acidity are attained, thus forming ammonium hydroxylamine disulfonate. The reaction is ordinarily effected at low temperatures. The pioneer chemist in this field of art was Friedrich Raschig (U. S. P. 1,010,177) and the reaction is generally called the Raschig hydroxylamine synthesis.

The chemical equations for the steps in this synthesis using sodium salts are as follows:

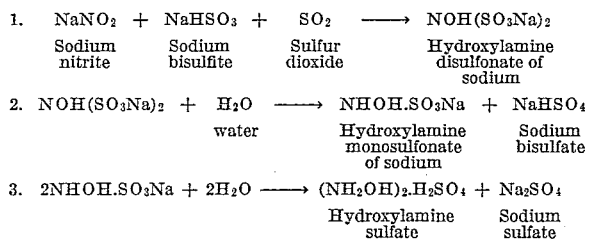

1. $NaNO_2 + NaHSO_3 + SO_2 \longrightarrow NOH(SO_3Na)_2$
   Sodium nitrite | Sodium bisulfite | Sulfur dioxide | Hydroxylamine disulfonate of sodium 2. $NOH(SO_3Na)_2 + H_2O \longrightarrow NHOH.SO_3Na + NaHSO_4$
   water | Hydroxylamine monosulfonate of sodium | Sodium bisulfate 3. $2NHOH.SO_3Na + 2H_2O \longrightarrow (NH_2OH)_2.H_2SO_4 + Na_2SO_4$
   Hydroxylamine sulfate | Sodium sulfate At about 5° C. or above the formation of nitrilotrisulfonic acid $N(SO_3H)_3$ is apt to occur together with Reaction 1.

The most commercially important and most stable of the group of nitrogenous products of the above reactions is hydroxylamine sulfate. The by-product sulfate formed by the hydrolysis shown in equation number 3 may vary in value and utility from a nearly worthless calcium sulfate sludge to the commercially desirable ammonium sulfate fertilizer depending upon the nitrite and bisulfite salts used in the reaction. Because of their relative instability and limited use, the mono and disulfonate salts are generally thought of as precursors of hydroxylamine sulfate.

A water-soluble nitrite salt is an essential raw material for this series of reactions. Alkali metal and alkaline earth nitrites are easily prepared by the absorption of a nitrous gas in strong aqueous solutions of the metal hydroxide or carbonate at temperatures about 70° C. The more heat-sensitive ammonium nitrite may be made by metathesis of the metal nitrite with an ammonium salt followed by separation of the ammonium nitrite so formed. By this procedure some 5–10% of the available ammonium nitrite is ordinarily lost in separation, and the product may contain as much as 20% ammonium nitrate (based on ammonium nitrite) as the result of oxidation during the operation. The nitrate has no value in the disulfonation reaction and requires expensive additional separation to have any marketability as a by-product.

One objective of this invention is to provide a disulfonation process whereby one can make, directly from a nitrous gas and in high yields, ammonium nitrite and a substantial amount of ammonium hydroxylamine disulfonate, said products being in the form of an aqueous solution and expressly suitable as a feed liquor for finishing disulfonation treatment and, if desired, hydrolysis by known methods.

Another object of this invention is to eliminate the necessity for the step of metathesis of a metal nitrite with an ammonium salt preparatory to making of ammonium hydroxylamine disulfonate, its hydrolyzed derivatives, and the valuable ammonium sulfate by-product.

Still another object of this invention is to produce a product containing only an insignificant amount of the undesirable ammonium nitrate.

These and other objects can be accomplished in the manufacture of nitrogenous compounds selected from the group consisting of ammonium nitrite, ammonium hydroxylamine disulfonate, hydrolyzed derivatives of this disulfonate, and their mixtures by the improvement which comprises: contacting in a reactor system a nitrous gas with a body of aqueous solution maintained during such contacting in an alkaline condition by the incorporation therein of ammonium sulfite and in the temperature range from about its freezing point up to 45° C.

The drawing is a flow diagram showing one means adapted for carrying out the invention. Nitrous gas is admitted at gas inlet 1 near the base of gas absorber 2 which is loaded with packing 3. A copious flow of aqueous alkaline solution flows over packing 3 countercurrent to the nitrous gas and drains by means of vapor-sealed leg 5 into reservoir 6 where it is chilled by submerged cooling coil 7. Water and ammonium sulfite are added to reservoir 6 as is necessary to maintain the volume and alkalinity of the aqueous solution. Pump 8 circulates the solution from reservoir 6 through recycle line 4 back to the top of gas absorber 2, the rate of flow being regulated by valve 9. Residual gases escape through vent 12. Samples of production may be abstracted from the solution at bleed 10.

When the circulated solution contains sufficient ammonium nitrite and ammonium hydroxylamine disulfonate, valve 11 is opened and the solution transferred to finishing reactor 13 which is equipped with cooling jacket 14, agitator 15, vent 16, ammonium bisulfite hopper 17, sulfur dioxide sparger 18, and Y-drain 19. Here the disulfonation reaction is finished by treatment with ammonium bisulfite-providing material and sulfur dioxide in the conventional manner. If sufficient ammonium sulfite remains in the solution after the absorption cycle, then it is necessary to treat it with sulfur dioxide only. By an ammonium bisulfite-providing material we mean the salt itself, or its equivalent in ammonium compounds reacting with sulfur dioxide to form ammonium bisulfite.

The product is either drawn off Y-drain 19 as finished ammonium hydroxylamine disulfonate solution or transferred to hydrolyzing reactor 20. Hydrolyzing reactor 20 is equipped with steam coils 21, agitator 22, vent 23, and product drain 24. The hydrolysis products are withdrawn from drain 24 when the desired degree of hydrolysis has been accomplished. While the process has been shown here as a batch operation, it may also be made continuous.

In the absorbing operation a complex physical and chemical transfer takes place. The following chemical equations are not intended to depict exactly what occurs, but are to serve as a guide for understanding the invention.

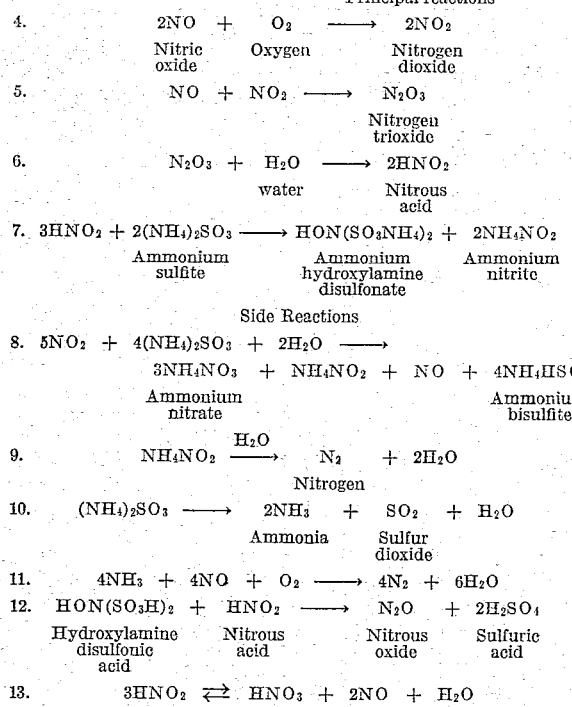

Principal reactions

4. $2NO + O_2 \longrightarrow 2NO_2$
   Nitric oxide, Oxygen, Nitrogen dioxide

5. $NO + NO_2 \longrightarrow N_2O_3$
   Nitrogen trioxide

6. $N_2O_3 + H_2O \longrightarrow 2HNO_2$
   water, Nitrous acid

7. $3HNO_2 + 2(NH_4)_2SO_3 \longrightarrow HON(SO_3NH_4)_2 + 2NH_4NO_2$
   Ammonium sulfite, Ammonium hydroxylamine disulfonate, Ammonium nitrite Side Reactions 8. $5NO_2 + 4(NH_4)_2SO_3 + 2H_2O \longrightarrow$
   $3NH_4NO_3 + NH_4NO_2 + NO + 4NH_4HSO_3$
   Ammonium nitrate, Ammonium bisulfite 9. $NH_4NO_2 \xrightarrow{H_2O} N_2 + 2H_2O$
   Nitrogen 10. $(NH_4)_2SO_3 \longrightarrow 2NH_3 + SO_2 + H_2O$
    Ammonia, Sulfur dioxide 11. $4NH_3 + 4NO + O_2 \longrightarrow 4N_2 + 6H_2O$ 12. $HON(SO_3H)_2 + HNO_2 \longrightarrow N_2O + 2H_2SO_4$
    Hydroxylamine disulfonic acid, Nitrous acid, Nitrous oxide, Sulfuric acid 13. $3HNO_2 \rightleftarrows HNO_3 + 2NO + H_2O$ The rate of side reaction 8 is greatly increased under acid conditions. Side reactions 12 and 13 proceed if the absorbing solution containing ammonium nitrite and ammonium hydroxylamine disulfonate is allowed to become acidic. Therefore, the absorbing solution should be maintained in an alkaline condition at all times. Side reaction 11 is believed to take place in the vapor phase. Side reactions 9 and 10 represent decomposition of ammonium salts with heat.

Nitrous feed gas for the process of the invention can be obtained by combustion of ammonia-air mixtures having less than 16 volume percent ammonia, by thermal oxidation of nitrogen, and from by-product streams. Explosive ammonia-air mixtures, for example, mixtures containing 16 volume percent ammonia, are thus avoided. If additional oxygen is necessary to maintain reaction it may be added to the feed stream or to the absorption apparatus at various points.

We prefer to use a nitrous gas feed corresponding to that obtained from the catalytic combustion at 95% efficiency of ammonia-air mixtures having from about 3–9 volume percent ammonia. Nitric oxide values in the absorption zone tail gas can then be reduced to minor proportions with a minimum of absorption zone volume per volume of gas fed. Nitrous gas obtained from efficient catalytic combustion of 8–9 volume percent ammonia-air mixtures is the especially preferred gas feed because of its economy and suitability for our purpose. Efficiency of ammonia combustion is measured by the amount of ammonia nitrogen converted to nitric oxide, the remainder going to molecular nitrogen.

Since nitrous gas from the preferred source or other nitrous gas similarly rich in oxygen contains a substantial excess of oxygen over and above that which is necessary to make nitrogen trioxide, the gas should be maintained during delivery to the absorber so that its ratio of nitric oxide:nitrogen dioxide is greater than 10:1. Otherwise an overbalance of nitrogen dioxide can result at the cold absorption temperatures, thus tending to form significant quantities of the undesired nitrate.

This preponderance of nitric oxide over all other oxides of nitrogen in an oxygen-bearing nitrous gas may be maintained by correlating the gas temperature with the time of delivery to the absorption reactor; if the time of delivery is long, the temperature should be high; and, if the time of delivery is short, the gas temperature may be reduced to minimize the cooling load on the absorption reactor. However, when the gas contains water vapor, it should not be cooled to such a degree that water will condense in the inlet line and corrode it.

Absorption of the oxygen-rich gas is most efficient when the gas is promptly brought into intimate contact with an abundance of the alkaline solution. The solution must be maintained below about 45° C. to prevent substantial thermal decomposition of ammonium nitrite, and above its freezing point since ice particles will occlude some ammonium nitrite and interfere with the precise finishing of the disulfonation to follow. The preferred temperature range in the absorption step is from about +1° to +35° C.; temperatures in this range insure against freezing the solution and against substantial thermal decomposition of the product. The most highly preferred temperatures for the solution are from 1–10° C. since losses of material by entrainment in the residual gas stream may be reduced then to minor proportions. However, one unexpected advantage of our process is that the nitrous gas absorption can be conducted in the temperature range from 25–35° C. at commercially attractive yields, thus permitting cooling of the absorption cycle with water rather than with expensive refrigerants.

We find that the highest yield of products can be obtained from the process of our invention when the concentration in aqueous solution of ammonium nitrite as such and as its hydroxylamine disulfonate reaction product is restricted to at most 20 weight percent (i. e. 3.12 gram mols per 1000 grams of solution) in the absorbing solution, preferably to about 12 weight percent. This this may be accomplished in continuous operation by withdrawing a portion of product solution from the body of absorbing solution gradually (incrementally or steadily) and making up the remainder of the solution with sufficient water and ammonium sulfite to substantially restore its initial volume and to maintain the necessary alkalinity. In batch operation the absorption reactor system may be shut down when the preferred nitrite concentration is reached, then drained, and recharged with fresh absorbent.

Due to its simplicity of construction and effectiveness for our purpose, a packed tower is the preferred type of absorption reactor for the practice of the invention. Commercially available packings such as Raschig rings or Berl saddles may be employed with good results. Auxiliary gas sparging means and flow redistributing means are often helpful on large absorbing reactor systems. Other apparatus designed for efficient liquid-to-gas contact may also be used. Glass-lined, lead-lined and other corrosion-resistant vessels are recommended for long service life.

It is preferred to operate the absorption reactor at atmospheric pressure for reasons of equipment economy, but, when desired, pressure lower than atmospheric may be used and superatmospheric pressures will allow reduction in the size of equipment necessary for a given production.

To obtain the best efficiency from packed towers employed in our absorption step we prefer to employ counter-current liquid-to-gas flow and to maintain a superficial liquid-to-gas volume flow ratio in excess of 0.06, preferably about 0.1 to 0.6. Said superficial flow ratio is defined as the ratio of volume rate of flow of aqueous solution in the tower: volume rate of flow of nitrous gas feed measured immediately prior to the tower inlet.

The following examples describe several ways in which the principles of the invention have been applied, but are not to be construed as limiting the invention. Superficial gas-to-liquid contact time is the quotient of the volume of the contact zone devoid of packing and liquid divided by the volume rate of feed of nitrous gas (anhydrous basis) at average absorption temperature.

*Example 1.*—11.97 mols in ammonia, as a 9 volume percent mixture of air, were burned at 95 percent efficiency and essentially constant rate during a period of 12 hours over a cobalt oxide catalyst maintained about 700° C. The burner product gas was quickly cooled to 100° C. in a tubular exchanger so as to maintain about 98 mol. percent of the nitrogen oxide content as nitric oxide, then continuously admitted into the base of a glass reactor 2.5" I. D., 8 feet tall, and packed to a depth of 86" with ¼" ceramic Berl saddles, the reactor being arranged and equipped similarly to that one shown in the drawing. The packing was irrigated by circulating about 3500 ml. of an aqueous ammonium sulfite solution at the rate of 2500 ml. per minute countercurrent to the flow of gas. Solution pH and temperature were measured in the solution draining from the base of the reactor. Ever-basic pH averaging 9 was maintained by the initial incorporation of 20 grams of ammonium sulfite in the absorbing solution and the subsequent addition of 1049 grams of this salt thereto at the rate of 39 grams per half hour. Solution temperature averaging 6° C. was maintained by refrigerating the contents of the reservoir. Superficial liquid-to-gas volume flow ratio was 0.43 and superficial gas-to-liquid contact time was 109 seconds.

The product from this operation was about 5.25 liters of aqueous solution having pH 9.3 and the concentration of ammonium nitrite in the solution as such and as its ammonium hydroxylamine disulfonate reaction product was 9.28 percent. The solution contained 4.70 mols. of ammonium nitrite, 3.7 mols. of hydroxylamine disulfonate, and less than 2% ammonium nitrate based on the nitrite and disulfonate content. The yield of free and converted ammonium nitrite based on the ammonia fed to the catalytic burner was 70.2 percent at this point.

A 2.335 liter aliquot of the above-described absorption reactor product was then fed to a 3-liter reactor equipped with an agitator and refrigerated to maintain a temperature in the range from minus 5 to 0° C. The solution was first treated with 65 grams of sulfur dioxide to obtain acidic pH of 5. Then 320 grams of an aqueous solution of ammonium bisulfite containing 1.5 mols of the bisulfite were added slowly. Following this, 105 grams of sulfur dioxide were added, and the solution adjusted to pH of 3.3 by addition of .59 mol. of ammonia (as a 28 weight percent aqueous solution) to complete the disulfonation reaction.

The so-treated solution was then refluxed for two hours at 100° C. The hydrolyzed product contained hydroxylamine sulfate equivalent to 3.38 mols. of hydroxylamine. The yield from finishing the disulfonation and the hydrolysis was 90.3% based on the nitrite and disulfonate fed, and the overall yield from ammonia burned was 63.4%.

Example 2. During a 13 hour period 12.34 mols. of ammonia, as a 9 volume percent mixture in air, were burned at 95% efficiency and essentially constant rate over a cobalt oxide catalyst maintained about 700° C. The burner product gas was quickly cooled to about 100° C. in a tubular heat exchanger so as to maintain about 98 mol. percent of the nitrogen oxide content as nitric oxide, then admitted into the reactor described in Example 1. The reactor was irrigated at the rate of 2500 ml. per minute by circulating an aqueous solution containing initially 6.44 mols. of ammonium nitrite and maintained alkaline by the gradual addition of the ammonium sulfite, the average pH being 8.1. By refrigerating the contents of the reservoir an average solution temperature was maintained at 35° C. Both pH and temperature were measured in the solution draining from the absorption reactor. Superficial liquid-to-gas volume flow ratio was 0.45 and superficial gas-to-liquid contact time was 114 seconds. During the run product solution was collected by withdrawing it from the bleed on the vapor-sealed leg. Concentration of ammonium nitrite in the solution as such and as its ammonium hydroxylamine disulfonate reaction product was 11.28 percent. It contained 8.41 mols. of ammonium nitrite and 6.48 mols. of ammonium hydroxylamine disulfonate. The yield based on ammonia burned was 68.4 percent.

We claim:

1. A process for making ammonium nitrite and ammonium hydroxylamine disulfonate which comprises: contacting a nitrous gas containing nitric oxide and nitrogen dioxide with a body of aqueous solution maintained during the contacting in an alkaline condition by the incorporation therein of ammonium sulfite and in the temperature range from about its freezing point to about 45° C., in which the nitrous gas delivered for contact with the body of aqueous solution has a nitric oxide: nitrogen dioxide mol ratio greater than 10:1 and the combined concentration of ammonium nitrite and ammonium hydroxylamine disulfonate in said body of aqueous solution is maintained below 3.12 gram mols per 1000 grams of solution during the contacting with the nitrous gas.

2. The process as defined in claim 1 in which the nitrous gas is the catalytic combustion product of an ammonia-air mixture.

3. The process as defined in claim 1 in which the nitrous gas is the catalytic combustion product of an ammonia-air mixture having from about 3 to about 9 volume percent ammonia, the gas is admitted to contact with the aqueous solution at nitric oxide: nitrogen dioxide mol ratio greater than 10:1, the superficial liquid-to-gas ratio is maintained above 0.06 during the contacting period, and the combined concentration of ammonium nitrite and hydroxylamine disulfonate in said body of aqueous solution is maintained below 3.12 gram mols. per 1000 grams of solution during the contacting period with the nitrous gas.

4. The process as defined in claim 3 wherein said nitrous gas is the catalytic combustion product of an ammonia-air mixture having from about 8 to about 9 volume percent ammonia.

References Cited in the file of this patent

UNITED STATES PATENTS

| | | |
|---|---|---|
| 1,471,711 | Siebert | Oct. 23, 1923 |
| 1,903,815 | Handforth | Apr. 18, 1933 |
| 1,978,431 | Kirst | Oct. 30, 1934 |
| 2,555,667 | Zeegers | June 5, 1951 |

OTHER REFERENCES

J. W. Mellor's: "A Comprehensive Treatise on Inorganic and Theoretical Chemistry," Vol. 10, page 266; 1930 ed. Longmans, Green and Co., N.Y.